C. H. T. HAGELSTEIN.
BUTTON SEWING MACHINE.
APPLICATION FILED OCT. 12, 1915.

1,255,527.

Patented Feb. 5, 1918.
7 SHEETS—SHEET 1.

Fig.1.

Inventor.
Christian H.T. Hagelstein,
by Heard Smith & Tennant.
Attys.

C. H. T. HAGELSTEIN.
BUTTON SEWING MACHINE.
APPLICATION FILED OCT. 12, 1915.

1,255,527.

Patented Feb. 5, 1918.
7 SHEETS—SHEET 6.

Inventor.
Christian H. T. Hagelstein,
by Heard Smith & Tennant
Attys.

UNITED STATES PATENT OFFICE.

CHRISTIAN H. T. HAGELSTEIN, OF BOSTON, MASSACHUSETTS, ASSIGNOR TO THE REECE BUTTON HOLE MACHINE COMPANY, OF BOSTON, MASSACHUSETTS, A CORPORATION OF MASSACHUSETTS.

BUTTON-SEWING MACHINE.

1,255,527. Specification of Letters Patent. Patented Feb. 5, 1918.

Application filed October 12, 1915. Serial No. 55,544.

*To all whom it may concern:*

Be it known that I, CHRISTIAN H. T. HAGELSTEIN, a citizen of the United States, residing at Boston, county of Suffolk, State of Massachusetts, have invented an Improvement in Button-Sewing Machines, of which the following description, in connection with the accompanying drawing, is a specification, like characters on the drawing representing like parts.

This invention relates to button-sewing machines of the general type illustrated in the following United States Letters Patent:

No. 690,978, January 14, 1902;
No. 886,826, May 5, 1908;
No. 1,077,602, November 4, 1913;
No. 1,089,649, March 10, 1914.

In the machines illustrated in the above-mentioned patents the button is sewed to the goods by first inserting a needle through the eye of the button and through the goods, then looping a thread about the needle by means of a looper, then withdrawing the needle to draw a primary loop of thread through the goods and through the shank of a button, then inserting the needle through said primary loop and through the goods outside of the button and manipulating the looper to place a second loop of thread about the needle, then withdrawing the needle again to draw said second loop through the primary loop thereby interlocking the two loops, and then spreading the second loop and delivering the spread loop over the head of the button and taking up the thread to tighten the knot thus formed.

Among the objects of the present invention is to improve machines of the above-mentioned type so as to provide a machine which will run more easily and quietly than prior machines, and which will eliminate much of the jar and vibration incident to the operation of prior machines, thereby producing a machine which can be run at a higher speed.

In the machines described in the above-mentioned patents the buttons are delivered successively into position to be attached to the goods by means of a chute which is constructed to hold the button with the shank thereof extending at right angles to the direction of feeding movement of the goods, and the chute is so constructed that when the button has been attached to the goods and the goods are fed forwardly, the attached button will be snapped out from the end of the chute, which operation frequently mars or injures the finish of the button. One of the objects of my present invention is to provide an improved chute construction and improved means for controlling the chute by which the buttons are fed into position with the shank extending in the direction of the line of feed and by which the chute is withdrawn to deliver the button as it is attached, thereby obviating any possibility of the button becoming marred or injured by being snapped out from the end of the chute.

Other objects of the invention are to provide an improved mechanism for operating the spreader, and other elements of the device which contribute to the easy running and comparatively noiseless quality of the complete machine, and otherwise to improve button sewing machines, all as will be more fully hereinafter described and set forth.

In order to give an understanding of my invention I have illustrated in the drawing a selected embodiment thereof which will now be described, after which the novel features will be pointed out in the appended claims.

Fig 4ª is a fragmentary detail view of the means for giving feeding movement to the feed prong;

1 indicates the frame of the machine which is formed with the usual base portion 2 and with the overhanging head or arm 3. The base portion sustains the usual work support 4 on which the work rests, and associated with the work support is the usual feed prong 5 which has a vertical movement to enter the work and a lateral movement to feed the work, as usual in machines of this sort. The mechanism for controlling and actuating the work support 4 and feed prong 5 will be presently described. 69 is the usual presser foot which engages the work held on the work support.

The needle is shown at 6 and is carried by the vertically-reciprocating needle bar 7. Associated with the needle is the usual hook-closer or cast-off 9 which is also carried by a vertically-reciprocating bar 10.

161 indicates generally the usual chute by which the shank-eyed buttons *b* are conducted into position to be attached to the work, the button at the lower end of the chute being in attaching position with the eye thereof situated so that the needle will pass therethrough as it descends.

90 is the looper which is carried by the oscillatory shaft 91 and which operates to loop the thread *t* about the hooked end of the needle at each descent thereof, so that at each upward movement the needle will draw a loop of thread upwardly through the work, and, as described in the above-mentioned patents, the first or primary loop is drawn through the eye of the button, and the secondary loop is drawn through the first or primary loop. This secondary loop is spread and then is placed over the head of the button. This is accomplished by the usual spreader 38 which has a horizontal movement to cause it to enter and spread the second loop and then a tipping movement to cause it to deliver the spread loop over the button.

The construction of the chute and of the spreader-operating mechanism, and the novel features thereof will be described more completely hereinafter.

The above are the essential elements of a button-sewing machine of this type and they coöperate to effect the sewing of the buttons to the goods in a manner similar to that described in the above-mentioned patents to which reference may be made.

In the sewing of buttons to goods by machines of the type above referred to, there is a relative lateral movement between the needle and the goods between the first and second thrusts of the needle, so that at the second thrust the needle will pass down through the goods outside of the button. In some of the above-mentioned patents, this relative movement is secured by giving the work a short feeding movement between the thrusts of the needle, while in other patents it is secured by mounting the needle in a swinging carrier so that the needle will be shifted from one position to the other without moving the work.

The machine herein illustrated is of the latter type and the needle bar 7 and also the reciprocating bar 10 carrying the cast-off 9 are reciprocably mounted in a carrier 8 which is constructed to vibrate laterally thereby to position the needle for successive thrusts thereof.

The needle-bar 7 and the bar 10 both derive their vertical reciprocating motion from a driving shaft 11 mounted in the frame and which is driven from a driving pulley 12. It will be understood, of course, that any suitable form of clutch and stop motion may be employed between the driving pulley 12 and the shaft 11 to stop and start the machine. but inasmuch as my invention does not relate to this stop motion, I have not illustrated it herein, as I do not wish to unnecessarily confuse the drawings.

The bar 10 which operates the cast-off 9 has secured thereto a block 16 carrying a stud 17 which operates in the slotted end of an arm 18 that is fast on a shaft 19 journaled in the frame at one side thereof, and said shaft has fast thereon another arm 20 carrying at its end a roll 21 which operates in a cam groove formed in one face 22 of a cam element 23 mounted on the shaft 11. The needle bar 7 also has a block 13 secured thereto carrying a stud or roll 301 which operates in the slotted end of an arm 14 that is fast on a sleeve 24 that in turn is loosely mounted on the shaft 19, said sleeve 24 having an arm 25 which carries a roll 26 operating in a cam groove in the opposite face 220 of the cam element 23. By this means a positive motion is given to both the needle bar and the cast-off by a comparatively simple mechanism.

In the operation of the machine, the needle is positioned by the vibrating carrier 8 so that at the first thrust. the needle will pass down through the eye of the button, and after said needle has been raised to draw a loop through the button eye, said needle is positioned so that on its next thrust it will pass down outside of the button, the latter remaining stationary during this operation.

In order to permit the carrier to have this vibrating motion, I have shown it as pivotally sustained at its upper end to swing about a horizontal axis, and have provided means to swing the lower end of the carrier in timed relation with the movements of the needle. This carrier is pivotally sustained at its upper end on two pivot screws 29 and 30 that are secured to the carrier and are journaled in bearings 31 and 32 secured to the overhanging arm 3 of the frame. The carrier is given its vibrating movement by means of a link 28 which pivotally connects the carrier to an arm 33 fast on a hollow shaft 34 journaled in bearings in the frame, said shaft 34 having an arm 36 fast thereto which carries at its end a roll operating in a cam groove formed in the side face of the cam element 27.

The loop spreader 38 has a construction similar to the spreader illustrated in the above-mentioned patents, and as described in said patents, it has a horizontal swinging movement to cause it to enter the second loop of thread after it has been drawn through the first loop, and also has a turning movement to tip the spread loop over the head of the button.

Figure 8:
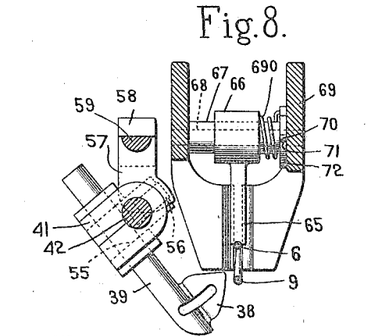
Fig. 8 is an enlarged section on the line 8—8, Fig. 3, showing the spreader and needle backer.
Figures 9, 17:
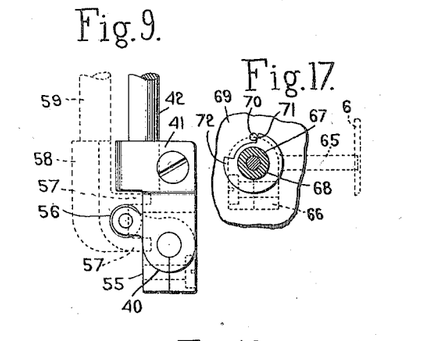
Fig. 9 is a fragmentary view showing the means for operating the spreader.
Fig. 17 is a sectional view through the shaft supporting the needle backer.
Figures 10, 15, 16, 18:
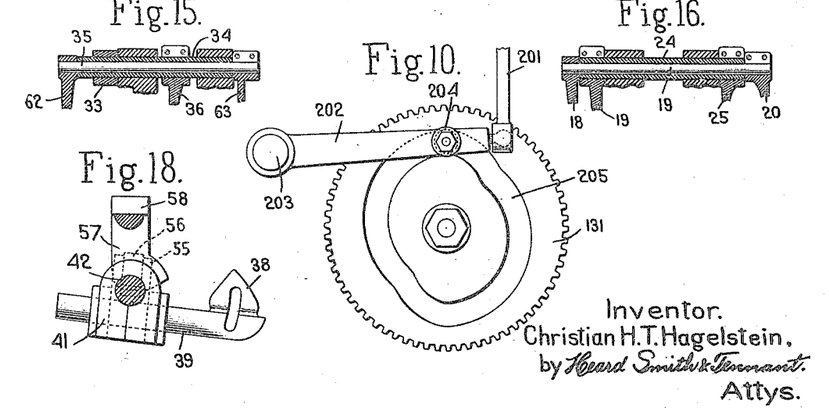
Fig. 10 is a detail view of the cam for operating the button feeding in the hopper.
Fig. 15 is a sectional view through the shafts that give tipping movement to the spreader and that oscillate the carrier for the needle bar.
Fig. 16 is a longitudinal sectional view through the shafts that operate the needle bar and the cast-off.
Fig. 18 is a view of the spreader showing the parts in a different position from that illustrated in Fig. 8.

I have provided herein an improved mechanism for operating the spreader and especially for giving the spreader its tipping movement, which mechanism is positive in its action and does not depend upon springs or other devices that are liable to be uncertain in action. The spreader 38 is carried by a shank 39 that is mounted for turning movement in the arms 40 of a head or block 41 that is secured to the lower end of a vertically-reciprocating shaft 42, said turning movement operating to give the spreader its tipping movement. This shaft 42 is mounted for turning movement in bearings 43 and 44 that are secured to the frame of the machine. The turning movement of the shaft 42 serves to throw the spreader 38 from the position shown in Fig. 8 into position to enter and spread the second loop, which position is illustrated in Fig. 18. The means for giving the shaft 42 its oscillating movement comprises an arm 45 fast on the shaft 42 and carrying at its end a roll operating in a forked end 46 of a lever 47 pivoted to the frame at 48, said lever being connected by a link 49 with an arm 50 fast on a vertically-extending shaft 51. This shaft 51 extends through the frame and has fast thereto an arm 52 that carries a roller operating in a peripheral cam groove 53 formed in the cam element 27. For turning the shaft 39 to give the spreader 38 the requisite tipping movement, I have secured a block 55 to said shaft 39 between the arms 40 of the head 41, said block carrying a roll 56 that plays between the two arms 57 of a forked head 58. This head 58 is secured to and carried by a reciprocating bar 59 that is vertically movable in the same bearing members 43 and 44 in which the shaft 42 is journaled. The bar 59 has fast thereto a block 60 carrying a roll or stud operating in the slotted end 61 of an arm 62 that is fast to a shaft 35 that extends through the hollow shaft 34. Said shaft 35 has fast thereto an arm 63 carrying at its end a roll operating in a cam groove in the face 64 of the cam element 27.

With this construction it will be seen that a downward movement of the bar 59 with its forked head 58 will operate through the coöperation of the forked end of the head with the roll 56 to turn the shaft 39 and thereby tip the spreader. The cam for actuating the bar 59 is so timed as to give the spreader this turning or tipping movement at the proper point in the cycle of operations after the spreader has entered the loop and has disengaged the thread from the hook of the needle, all as provided for in the above-mentioned patents. It will be remembered that the shaft 42 has a turning movement to bring the spreader into and out of operative position, and during such movement the roll 56 will be swung horizontally relative to the head 58. Said head 58 is so constructed and the arms 57 thereof have such an extent or breadth that the roll 56 is not moved beyond the arms during the oscillatory movement of the shaft 42, and, therefore, an operative engagement between the head 58 and roll 56 is provided in all positions of the spreader.

65 indicates the usual needle backer which supports the needle at the time that the spreader 38 is moving into the loop-spreading position shown in Fig. 18, thereby to prevent the needle from being bent back due to the strain on the thread. I have herein provided means whereby this needle backer may be adjusted both vertically and horizontally so that it can be made to accommodate any desired position of the needle. This backer is provided with a split hub 66 which is clamped to a sleeve 67 that is mounted on a pivot shaft 68 that is carried in the usual presser foot 69. This sleeve 67 is acted upon by a spring 690, one end of which is fast to the sleeve and the other of which engages the presser foot, said spring tending normally to throw the free end of the needle backer upwardly. This upward movement is limited by a stop pin 70 carried by the presser foot and engaging a stop shoulder 71 formed on a flange 72 carried by the sleeve 67. During the descent of the needle the needle bar will engage the needle backer and the spring 690 allows the needle backer to move downwardly with the needle bar.

By using the split hub 66, it is possible to adjust the needle backer horizontally on the sleeve 67, and also to adjust the hub 66 about the sleeve 67, thereby to raise or lower the end of the needle backer.

The work support 4 is carried by a stem 73 slidably mounted in bearings 74 carried by the base 2 of the frame, as usual in machines of this type. This work support is given a vertical movement in timed relation with the stitching operation by means of a cam 75 mounted on a shaft 76 journaled in the base of the machine. For this purpose the cam 75 is provided with a cam groove 77 in which is received a roll 78 carried by an arm 79 loosely mounted on a shaft 80 in the frame of the machine. This arm 79 is connected by a link 81 to a floating lever 82 that has a pin-and-slot connection with the lower end of the stem 73. The other end of the floating lever 82 is pivotally connected to a plunger 84 operating through a bearing member 85 and secured to the base frame 2, said plunger having secured to its lower end a connection 86 leading to a treadle. The bearing member 85 is made hollow to receive a spring 87 which encircles the plunger 84, one end of which rests against a shoulder 88 on the bearing, and the other end of which rests against a shoulder 89 on the plunger.

260 is a collar adjustably mounted on the plunger 84 and engaging the lower end of the bearing 85, said collar limiting expansive action of the spring 87 and determining the normal position of the work support 4 relative to the presser foot 69.

It will be understood that the work onto which the buttons are to be sewed is confined between the work support 4 and the presser foot 69. The spring 87 acts to hold the work support yieldingly against the work, and the adjustment of the collar provides for adjusting the normal pressure of work support against the work and also provides for adjusting the normal position of the work support relative to the presser foot to accommodate work of different thicknesses.

During the operation of the machine, the cam groove 77 will vibrate the arm 79 and thus lower the work support 4 to release the work at the time it is to be fed forward, and then raise the work support into contact with the work again during the sewing operation, and during this operation the lever 82 fulcrums against the upper end of the plunger 84. If during the operation, a thick portion of the work passes under the presser foot, then the spring 87 will yield to accommodate such thicker portion of work. In inserting or removing work, it is customary to depress the work support 4 so as to separate it from the presser foot, and this is accomplished by means of the treadle secured to the connection 86. When the treadle is operated, the spring 87 will be compressed and the link 82 will fulcrum about the upper end of the lever 81. By means of this construction a comparatively light spring 87 is sufficient to give the necessary yielding pressure of the work support against the work, and as a result the cam groove 77 is relieved from excessive strain, such as would result if a heavier spring were used as in prior constructions.

The looper 90 for looping the thread $t$ about the needle is of usual construction and is operated in usual manner. It is shown as secured to a vertical oscillatory shaft 91 which has fast thereto at its lower end an arm 92 carrying a pin operating in a slot in the end of a bell-crank elbow-lever 93 pivoted at 94 and connected by a link 95 with a lever 96 which is pivoted to the frame at 97 and carries a roll operating in a cam groove 98 of a cam element 99 fast on the shaft 76.

The feed prong 5 is given an upward movement to cause it to enter the work, then a horizontal movement to feed the work, then a downward movement to withdraw it from the work, as usual in machines of this type. It is carried by a bar 100 that reciprocates through a sleeve 101, said bar being connected at its lower end to an arm 102 that is loose on the shaft 80 and has a roll 103 operating in a cam groove in the face 105 formed in the cam element 75 which is fast on the shaft 76. This cam gives the bar 100 and feed prong 5 their vertical movement. The horizontal movement of the feed prong necessary to feed the work is secured by means which give the sleeve 101 a horizontal vibratory movement. This sleeve 101 is pivotally mounted at 106 to an arm 107 that is mounted on a rock-shaft 108 sustained in suitable bearings in the base of the machine. Said shaft 108 has fast thereon an arm 109 provided with a curved slot or groove 110 in which operates a roll or stud 111 carried by a block 112. This block 112 is slidably mounted on a guiding rod 116 and has pivotally connected thereto a link 113 which is connected at its lower end to an arm 114 that is loosely mounted on the shaft 80, said arm 114 having a roll operating in a cam groove formed in the cam element 99. With this construction the vibrating movement of the arm 114 will move the link 113 and block 112 vertically and will thus oscillate the shaft 108, thereby moving the sleeve 101 horizontally.

I have provided herein means for adjusting the length of the throw of the sleeve 101 thereby to adjust the feed. This is accomplished by adjusting the block 112 toward and from the shaft 108 in the slot 110. The vertical movement of the block 112 is fixed by the cam groove in the cam element 99, and, therefore, the nearer the block 112 is to the fulcrum shaft 108, the greater will be the horizontal or feeding movement given to the sleeve 101 and vice versa.

For adjusting the block 112 toward and from the fulcrum shaft 108, I have provided means for shifting the position of the guiding rod 116. This rod 116 is pivoted at its lower end to a fixed arm 117, the pivotal point 118 between the guide rod 116 and its arm 117 being in line with the pivotal connection between the link 113 and its arm 114 when the parts are in position to place the feed prong 5 in its starting position. The groove 110 is made on the arc of a circle having the point 118 as its center when the parts are in this position. The guide rod 116 carries a block 119 which has a nut 120 pivotally connected thereto, said nut having screw-threaded engagement with an adjusting screw 121 that is rotatably supported in bearings 122 carried by the base frame 2 and which carries a knurled head 123 on the exterior of the machine. By turning the adjusting screw the nut 120 will be advanced or retracted, thus swinging the guide rod 116 about its pivot 118 and moving the block 112 toward or from the shaft 108. Because of the fact that the slot 110 is on the arc of a circle struck from the pivotal point 118 when the parts are in the above-named position, this adjusting movement of the block 112 does not give horizontal movement to the feed prong 5. This is important because it insures that the feed prong 5 will always enter the work at a given point regardless of the adjustment of the feed. In the operation of machines of this type it is desirable that the feed prong should enter the work in one of the holes made by the needle, and this end is insured by this construction regardless of the adjustment of the feed.

It will be noted that there are a certain number of cams required to actuate the needle bar, the cast-off, the loop spreader, the needle bar carrier, and the other parts of the mechanism that are above the work support, and that other cams are necessary to operate the feed, the work support, the looper and other parts that are beneath the work support. In order to provide a smooth-running machine, I have divided the necessary cams into two sets, those which operate the mechanism carried by the overhanging arm being mounted on the shaft 11 in the overhanging arm, and those operating the feed, work support and looper that are sustained in the bed of the machine being mounted on the shaft 76 in the base of the machine. By thus dividing the cams into two groups and mounting them, as shown, the construction is simplified because it avoids the presence of levers extending from a shaft in the head to mechanism in the base of the machine to actuate the latter. The shaft 76 in the base of the machine may be driven from the shaft 11 by any suitable means, such as gearing or a chain. I have herein shown gearing for this purpose, the shaft 11 having a gear 130 thereon which meshes with an intermediate gear 131 journaled on the frame, said intermediate gear meshing with and driving a gear 132 on the shaft 76.

The take-up mechanism for tightening the thread as each button is sewed is of usual construction and is placed on the base of the machine in a convenient position. The take-up is an arm 135 fast on a rock-shaft 136 journaled in the machine, said arm being connected by a link 137 to an arm 138 fast on the rock-shaft 80. The shaft 80 has fast thereto an arm 140 provided with a roll 141 operating in a cam groove in the face 142 of the cam element 99. The thread $t$ runs from the looper 90 through an eye 143 on the take-up arm, thence around a guide roll 144 carried by the bearing 74, thence under a guide 145 and between a clamping member 146 on the shaft 136 and a clamping surface 147 on an arm 148 that is pivotally mounted to the take-up arm 135 at 149, and is acted on by spring 150 that is connected to an arm 151 fast on the shaft 136. 152 is a stop lever pivoted at 153 to the frame 2, the end 154 of said stop lever being in position to engage the end 155 of the arm 148. As the take-up lever moves upwardly the thread is held between the gripping surfaces 146 and 147. It is the downward movement of the take-up lever which draws the thread tight around the button, and during the latter part of this movement the end 155 of the arm 148 which carries the gripping surface 147 engages the end 154 of the stop arm 152 and thereby releases the thread. The parts are adjusted so that this release occurs at the proper time in the cycle of operations to permit the feeding of the work forward and the operation of the needle without danger of breaking the thread.

The buttons to be sewed onto the goods are contained in a hopper 160 which is supported by the frame of the machine. 161 is a chute leading from the hopper to the sewing mechanism and by which the buttons are delivered into position to be sewed onto the goods. The chute 161 is of usual construction in that it comprises a back plate 162 and a front piece provided with a slot 163 in which the shanks 164 of the buttons $b$ are received, the heads of the buttons being confined between the front and back pieces. In my construction the front piece is made from the two parts 165 and 166 which are spaced from each other to produce the slot 163 and are secured together by ears 167 fast to one part and riveted or screwed to the other. The back plate 162 is carried by adjusting screws 168 that are sustained in the front part and by which the back part can be adjusted relative to the front part to accommodate different sizes of buttons. The screws 168 are connected by a link 246 so that they will be operated in unison.

In prior machines, so far as I am aware, the chute has been constructed to hold the buttons and to present them into attaching position with the shanks extending in a direction at substantially right angles to the direction of the feeding movement of the work, and the chute has been constructed to swing in a direction substantially parallel to such feeding movement thereby to present a button into attaching position and then withdraw as the sewing operation is carried on. With this construction each button would be snapped out from the chute as it was delivered therefrom, and in this operation the buttons were liable to become marred or scratched. In order to avoid any danger of thus injuring the buttons I have constructed my chute so that the buttons are held therein and presented into attaching position with their shanks extending in a direction parallel to the direction of feed, and so that the chute will move in a direction at substantially right angles to the direction of feeding movement in presenting a button into attaching position and in withdrawing to deliver said button.

Figure 1:
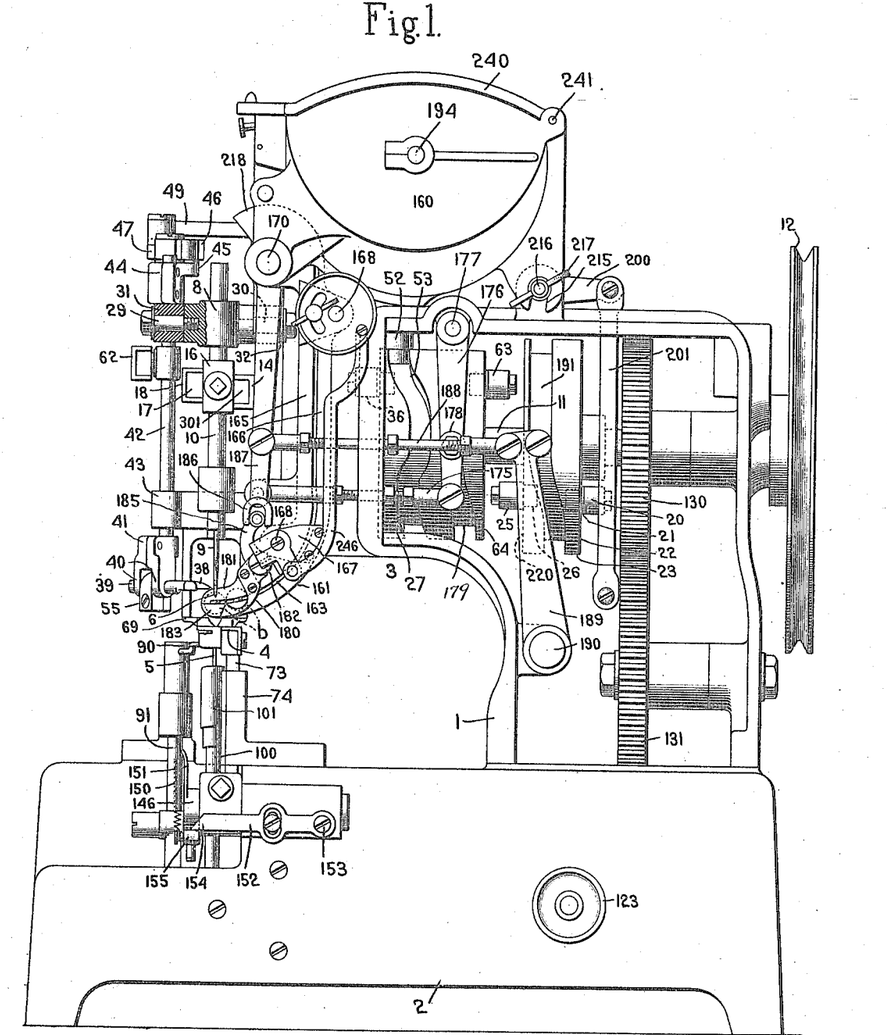
Figure 1 is a front elevation of a machine embodying my invention with the side cover of the frame removed to show some of the interior mechanism.
Figure 2:
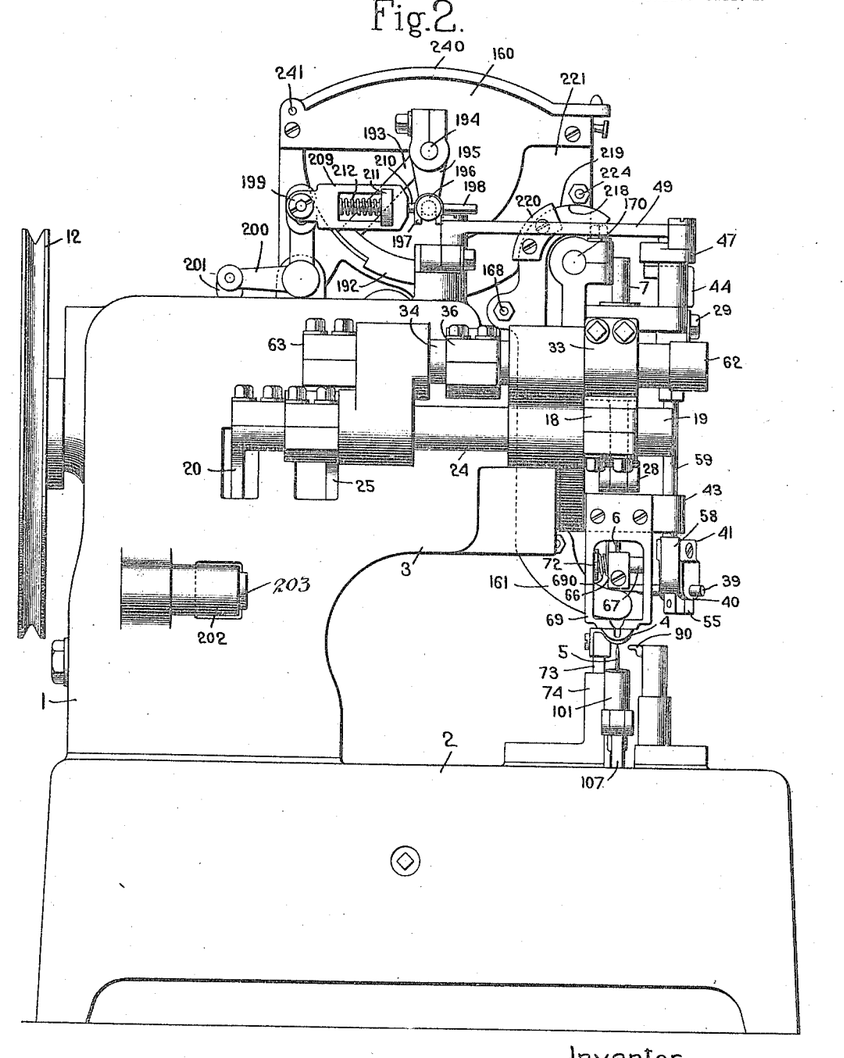
Fig. 2 is a rear elevation.
Figure 3:
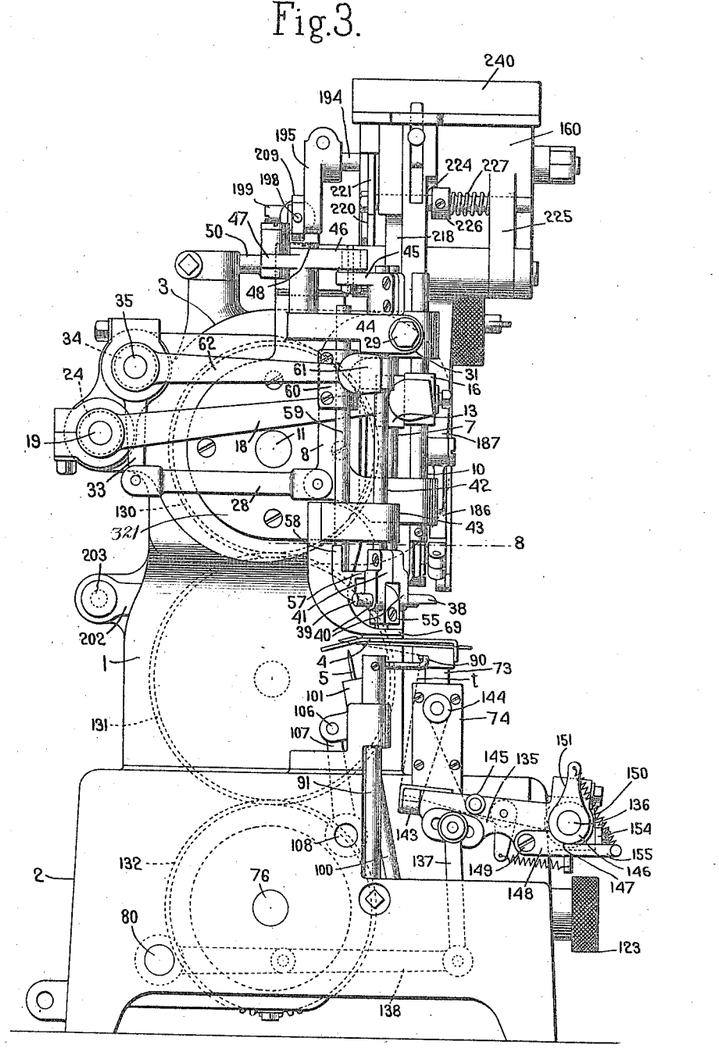
Fig. 3 is an end view.
Figure 4:
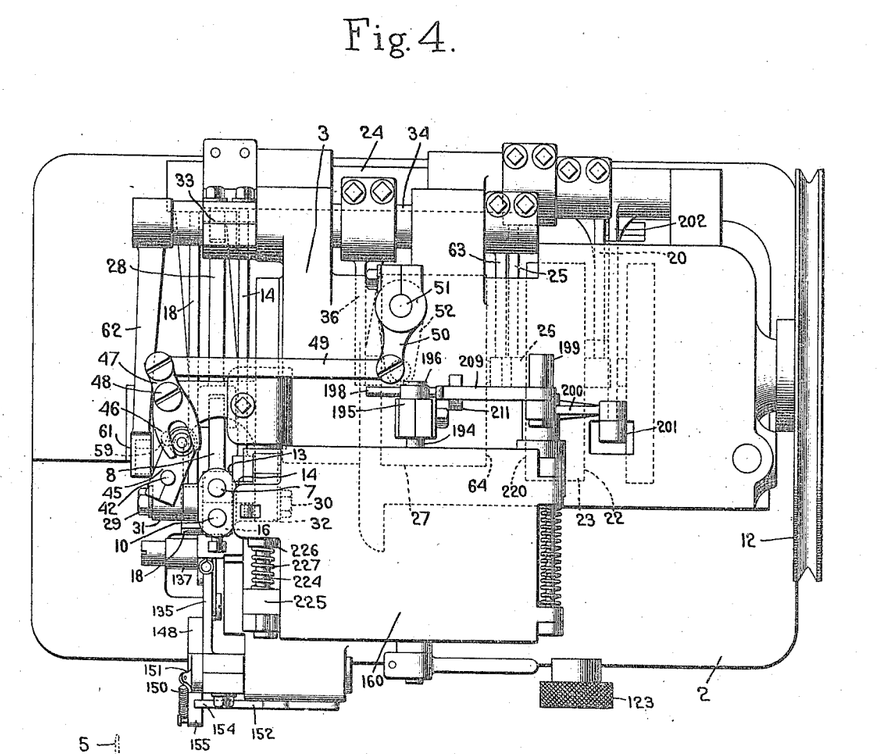
Fig. 4 is a top plan view.
Figure 4A:
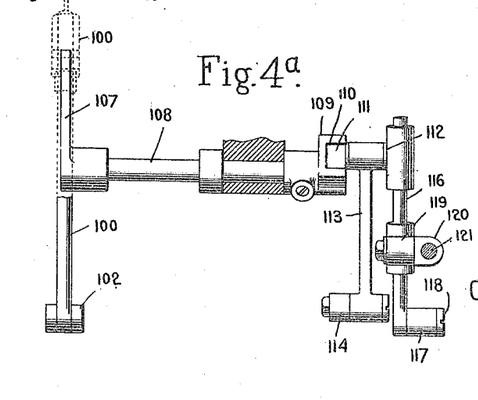
Figure 5:
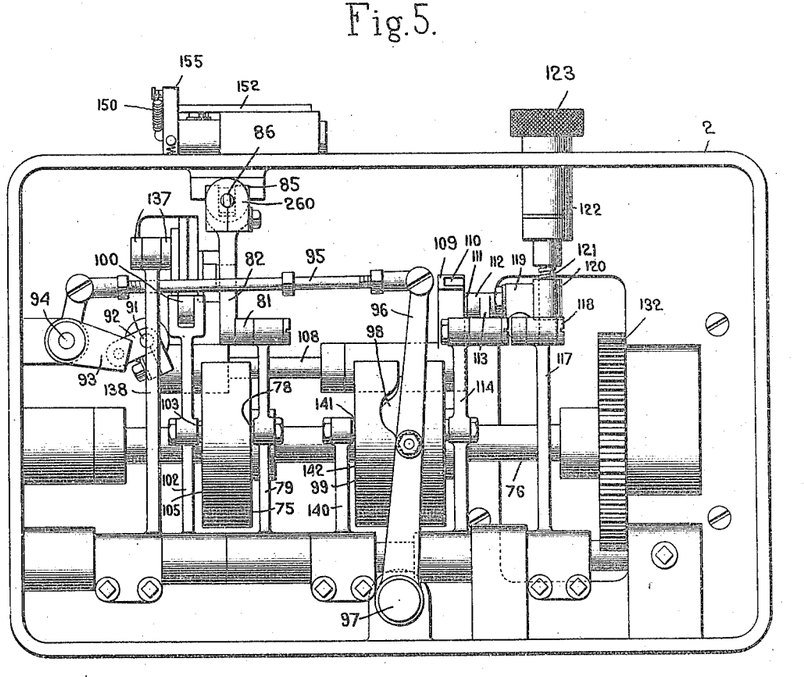
Fig. 5 is a bottom plan view.
Figure 6:
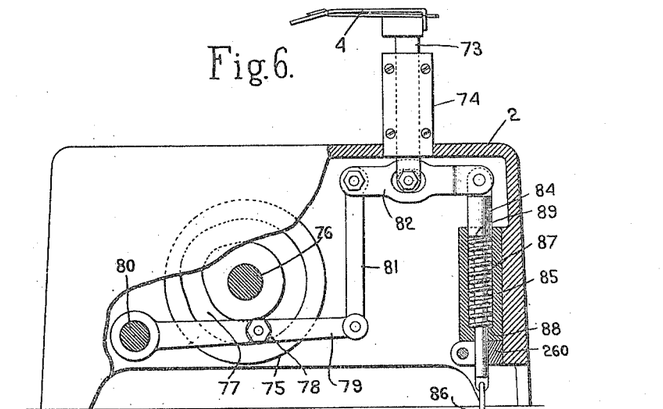
Fig. 6 is a detail view of the work support and its operating mechanism.
Figure 7:
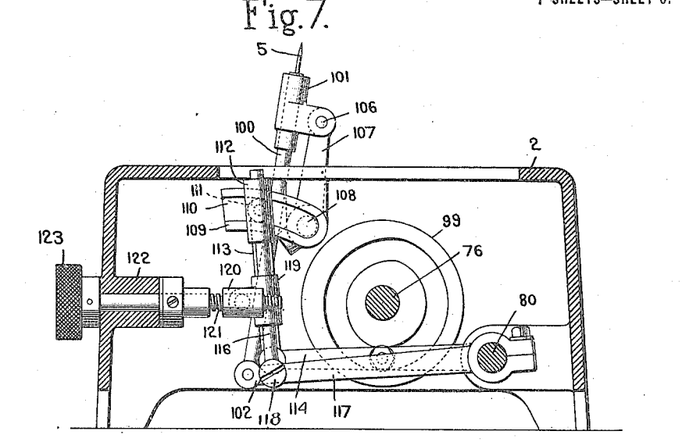
Fig. 7 is a sectional view showing the feed mechanism.
Figures 11, 12:
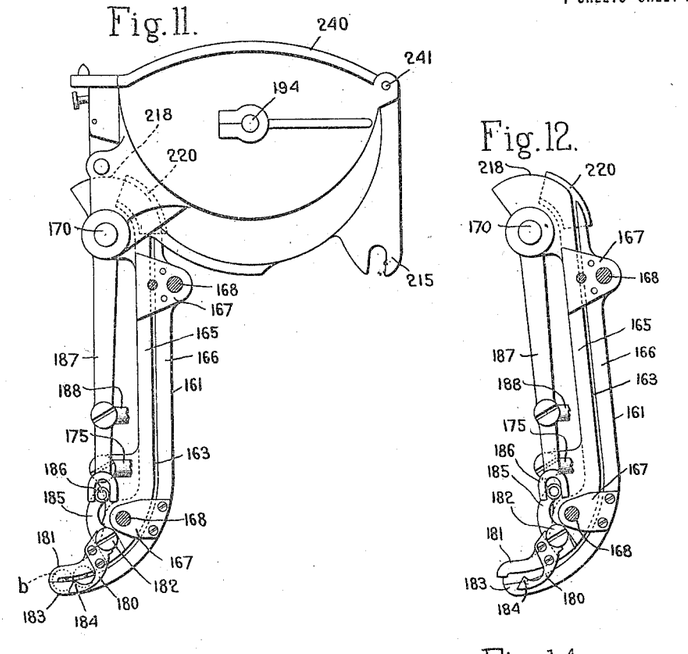
Fig. 11 is a side view of the hopper and chute removed from the machine.
Fig. 12 shows the chute in its retracted position.
Figure 13:
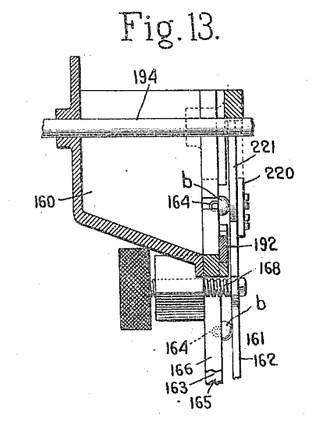
Fig. 13 is a section on the line 13—13, Fig. 14.
Figure 14:
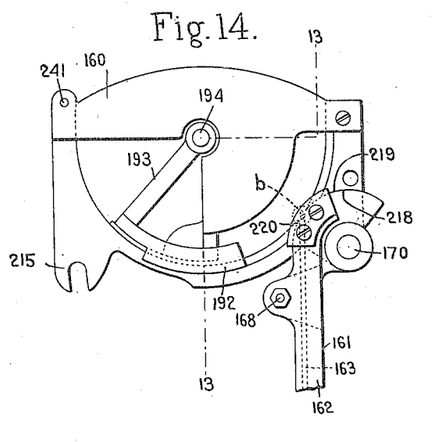
Fig. 14 shows the opposite side of the hopper from that shown in Fig. 11 with a part removed.

To hold and deliver the buttons with their shanks extending in a direction parallel to the direction of feeding movement, I arrange the front pieces 165 and 166 so that the shank-receiving slot 163 opens toward the front of the machine, as clearly seen in Figs. 1, 11, 12.

To provide for vibrating the chute in a direction at right angles to the direction of feed, I pivot the chute on a shaft 170 carried by the frame of the machine and extending in the direction of feed. While any suitable mechanism may be used to give the chute its movement, that herein illustrated comprises a link 175 pivotally connected thereto, which link is pivotally connected to an arm 176 that in turn is pivoted to the frame of the machine at 177. This arm carries a roll 178 operating in a peripheral groove 179 formed in the cam element 27. It will thus be seen that after the chute has been moved into the position shown in Fig. 11 to present a button into attaching position, and the button has been attached or partially attached to the work, the chute will be moved back into the position shown in Fig. 12, thus delivering the button therefrom, and in this position it is entirely out of the way of the button during the feeding movement of the work, and there is no danger that the button will become injured in leaving the chute.

In order to insure positive delivery of the buttons from the chute as they are sewed to the goods, I have herein illustrated a pick-off mechanism which separates the last button from the other buttons in the chute and insures that said button will be delivered from the chute as the latter is withdrawn. The lower end 181 of the member 165 of the chute is pivotally mounted at 182 so that it moves toward and from the end 183 of the other element 166. This pivoted end 181 has fast thereto a pick-off member 180 having a V-shaped end 184. Said pivoted member 181 is also provided with an arm 185 carrying a roll that operates in the slotted end 186 of a lever 187 that is pivoted on the shaft 170. This lever 187 has pivotally connected thereto a link 188 that in turn is pivotally connected to an arm 189 pivoted to the frame at 190, said arm 189 having a roll operating in a cam groove 191 formed in the cam element 23. The cam grooves 191 and 179 are so designed relative to each other that the lever 187 will be stationary relative to the chute during the movement of the chute until such time as the button is to be delivered from the chute. At this time the cam 191 will swing the lever 187 relative to the chute into the position shown in Fig. 12, thereby raising the pivoted end 181 of the chute and swinging the nose 184 of the pick-off 180 upwardly between the shanks of the last button and the button next thereto. By this means the last button is released and the other buttons are retained in the chute by the nose 184.

The hopper 160 is provided with the usual button-feeding member 192 by which the buttons are agitated and fed to the upper end of the chute. In my machine this button-feeding member has an arcuate shape and is carried by an arm 193 fast on a shaft 194 extending transversely through the hopper 160. This shaft 194 has fast thereto an arm 195 on the back side of the hopper, said arm having a stud 196 that is adapted to be received in the forked portion 197 of a link 198 that is pivoted at 199 to an elbow lever 200. Said elbow lever is connected by a link 201 to an arm 202 that is pivoted to the frame at 203, said arm having a roll 204 therein operating in a cam groove 205 formed in the side face of the intermediate gear 131. This cam groove 205 is so designed as to give the button-feeding member a comparatively slow forward feeding movement and then a quick return movement. The advantage of this is that less time is consumed in retracting the button feeder, and the latter has a correspondingly longer time in which to feed the buttons. Moreover, this enables the button feeder to be given a slower forward movement which is more effective in feeding the buttons without scattering them than a quick movement would be.

The link 198 is made elastic so that it will give or yield in case the button feeder strikes an obstruction or engages a button that is caught in the chute or is abnormal in size, thus preventing injury to the parts. This yielding or elastic feature is obtained by making the link in two parts 209, 210 which have a telescopic action. The part 209 is yoke-shaped and the part 210 is provided with a collar 211 which operates between the arms of the yoke and engages a spring 212 that surrounds the member 210 and is confined between the collar 211 and the back of the yoke. This spring will yield in case the forward movement of the button-feeding element is retarded by its engagement with any obstruction. The expansible link 198 can be readily disconnected from the arm 195 by simply swinging said link upwardly to disengage the forked portion 197 from the stud 196.

The hopper is pivotally mounted on the shaft 170 to provide for tipping it over into a position to empty the buttons therefrom, and is provided with a forked portion 215 adapted to engage a stud 216 that carries a clamping nut 217. When the clamping nut is tightened, the hopper will be locked in its operative position, but when the clamping nut is loosened the hopper can be swung about the shaft 170 thereby to empty it of buttons. Before this can be done, however, the link 198 has to be disconnected from the pin 196.

The upper end of the chute is formed with the curved surface 218 struck on an arc having the shaft 170 as a center, and the hopper is provided with a correspondingly curved surface 219. This construction is provided to permit the hopper to be swung about the shaft 170, as above described.

The chute is formed at its upper end with a plate 220 which overlies a plate 221 forming a part of one wall of the hopper. This plate 221 is acted upon by springs which yieldingly hold it against the guide plate 220 so that when the chute is adjusted for different sizes of buttons, the plate 221 of the hopper will always be in proper position position relative to the back plate 162 of the chute. For this purpose the plate 221 is provided with a stud 224 that is slidably mounted in an ear 225 carried by the hopper, said stud having a collar 226 adjustable thereon and carrying a spring 227 which is confined between said collar and the bearing 225, the spring operating to keep the plate 221 in contact with the guide plate 220.

The hopper is provided with the usual cover 240 pivoted thereto at 241.

It will be noted that in the illustrated embodiment of the invention the chute swings bodily about its shaft 170. The discharge opening of the hopper is so constructed that the button-receiving slot of the chute will be in communication therewith in all positions of the chute, so that the swinging movement of the chute does not interfere at all with the delivery of buttons from the hopper into the chute.

In the present invention I have provided a construction wherein the parts which control the needle bar, the cast-off, the bar 10, and the shaft 42, and other mechanism for operating the spreader, can be readily removed from the overhanging arm 3. To provide for this, I mount the bearings in which these parts reciprocate on a head plate 321 which is detachably secured to the overhanging arm, thus making it possible to remove this head plate with the mechanism supported thereby without disturbing the other parts of the machine.

While I have illustrated herein a selected embodiment of my invention from which the principle thereof will be readily understood, yet I wish to state that the invention is not limited to the constructional details shown, as these may be varied in many ways without departing from the invention as expressed in the appended claims.

I claim:

1. In a button-sewing machine, the combination with work-feeding means, of means to deliver successive shank-eyed buttons into attaching position with the shanks thereof extending in a direction parallel to the feeding movement of the work, and means to attach each button to the work as it is delivered into attaching position.

2. In a button-sewing machine, the combination with work-feeding means, of means to deliver successive shank-eyed buttons into attaching position with the shanks thereof extending in a direction parallel to the feeding movement of the work, and sewing mechanism to form interlocking loops by which said buttons are attached to the work.

3. In a button-sewing machine, the combination with work-feeding means, of a chute to deliver successive shank-eyed buttons into attaching position with the shank thereof extending in a direction parallel to the feeding movement of the work, and means to sew each button to the work.

4. In a button-sewing machine, the combination with work-feeding means, of a chute constructed to hold shank-eyed buttons with the shanks thereof parallel to the direction of the feeding movement of the work and to deliver the buttons successively to the work with the shanks in this position, and means to attach said buttons to the work.

5. In a button sewing machine, the combination with work-feeding means, of a chute to deliver successive shank-eyed buttons into attaching position with the shanks thereof extending in a direction parallel to the work-feeding movement, means to vibrate the chute in a lateral direction relative to the feeding movement of the work, and means to attach the buttons to the work.

6. In a button-sewing machine, the combination with work-feeding means, of a chute to hold a plurality of shank-eyed buttons with their shanks extending in a direction parallel to the work-feeding movement, means to vibrate the chute in a lateral direction relative to said work-feeding movement thereby to present the end button in said chute into attaching position and then to withdraw said chute, and sewing mechanism to sew the end button to the work.

7. In a button sewing machine, the combination with work-feeding means, of a chute to hold a plurality of shank-eyed buttons with their shanks extending in a direction parallel to the work-feeding movement, means to vibrate the chute in a lateral direction relative to said work-feeding movement thereby to present the end button in said chute into attaching position and then to withdraw said chute, sewing mechanism to sew the end button to the work, and a button pick-off for separating said end button from the other buttons and retaining said other buttons in the chute as it is withdrawn.

8. In a button-sewing machine, the combination with work-feeding means, of a chute to hold a plurality of shank-eyed buttons, said chute being normally closed at its delivery end to prevent the escape of buttons therefrom, means to vibrate the chute to present the last button therein into attaching position and then withdraw the chute, means to attach to the work each button as it is brought into attaching position, means to open the end of the chute as it is withdrawn thereby to allow the attached button to be delivered therefrom, and a button pick-off to retain the other buttons in the chute when it is opened.

9. In a button-sewing machine, the combination with work-feeding means, of a chute to hold a plurality of shank-eyed buttons with their shanks extending in a direction parallel to the work-feeding movement, said chute being normally closed at its delivery end to prevent the escape of buttons therefrom, means to vibrate said chute to present the last button therein into attaching position and then withdraw the chute, means to attach to the work each button as it is brought into attaching position, means to open the end of the chute as it is withdrawn thereby to allow the attached button to be delivered therefrom, and a button pick-off to retain the other buttons in the chute when it is opened.

10. In a button-sewing machine, the combination with work-feeding means, of a chute to hold a plurality of shank-eyed buttons with their shanks extending in a direction parallel to the work-feeding movement, said chute being normally closed at its delivery end to prevent the escape of buttons therefrom, means to vibrate the chute in a direction at right angles to the work-feeding movement thereby to present the last button therein into attaching position and then withdraw the chute, means to attach to the work each button as it is brought into attaching position, and means to open the end of the chute as it is withdrawn thereby to allow the attached button to be delivered therefrom.

11. In a button-sewing machine, the combination with work-feeding means, of a chute to hold a plurality of shank-eyed buttons with their shanks extending in a direction parallel to the work-feeding movement, said chute being normally closed at its delivery end to prevent the escape of buttons therefrom, means to vibrate the chute in a direction at right angles to the work-feeding movement thereby to present the last button therein into attaching position and then withdraw the chute, means to attach to the work each button as it is brought into attaching position, means to open the end of the chute as it is withdrawn thereby to allow the attached button to be delivered therefrom, and a button pick-off to retain the other buttons in the chute when it is opened.

12. In a button-sewing machine, the combination with work-holding means, of a chute to hold a plurality of shank-eyed buttons, said chute having at its delivery end a pivoted gate portion that normally closes said end, means to move said gate portion to open the end of the chute thereby to allow the end button to be discharged therefrom, and a button pick-off secured to said gate portion and moved thereby into position to close the chute and prevent the escape of the other buttons therein when the chute is opened.

13. In a button-sewing machine, the combination with work-holding means, of a chute to hold a plurality of shank-eyed buttons, said chute having at its delivery end a pivoted gate portion that normally closes said end, means to move said gate portion to open the end of the chute thereby to allow the end button to be discharged therefrom, and a button pick-off rigid with the gate portion and moved thereby into position to close the chute and retain the other buttons therein when the chute is open.

14. In a button-sewing machine, the combination with work-holding means, of a chute to hold a plurality of shank-eyed buttons, said chute having at its delivery end a pivoted gate portion that normally closes said end, means to move said gate portion to open the end of the chute thereby to allow the end button to be discharged therefrom, and means carried by the gate and moving therewith to close the chute and retain the other buttons therein when the chute is opened to permit the end button to be discharged therefrom.

15. In a button-sewing machine, the combination with button-attaching mechanism, of a chute for delivering buttons thereto having a slot for receiving the shanks of the buttons, a gate for closing the delivery end of said slot, means for opening the gate to allow the end button to be discharged from the chute, and means rigid with the gate to prevent the escape of other buttons when the gate is opened.

16. In a button-sewing machine, the combination with button-attaching mechanism, of a chute for delivering buttons thereto having a slot for receiving the shanks of the buttons, a gate for closing the delivery end of said slot, means for opening the gate to allow the end button to be discharged from the chute, and means carried by the gate to prevent the escape of other buttons when the gate is opened.

17. In a button-sewing machine, the combination with button-attaching mechanism, of a chute comprising in its construction two members separated to provide a button-receiving slot, the end of one of said members being movably mounted and constituting a gate to close the chute, and means to open the gate to allow the end button to be discharged therefrom.

18. In a button-sewing machine, the combination with button-attaching mechanism, of a chute comprising in its construction two members separated to provide a button-receiving slot, the end of one of said members being movably mounted and constituting a gate to close the chute, means to open the gate to allow the end button to be discharged therefrom, and means to prevent the escape of other buttons from the chute when the gate is open.

19. In a button sewing machine, the combination with a chute to convey buttons into attaching position and comprising in its construction two members separated to provide a button-receiving slot, the end of one of said members being movably mounted and constituting a gate to close the chute, of means to open the gate to allow the end button to be discharged from the chute.

20. In a button-sewing machine, the combination with a chute to convey buttons into attaching position and comprising in its construction two members separated to provide a button-receiving slot, the end of one of said members being movably mounted and constituting a gate to close the chute, of means to open the gate to allow the end button to be discharged from the chute, and means to prevent the escape of the other buttons in the chute when the gate is open.

21. In a button sewing machine, the combination with a chute to convey buttons into attaching position and comprising in its construction two members separated to provide a button-receiving slot, the end of one of said members being movably mounted and constituting a gate to close the chute, of means to open the gate to allow the end button to be discharged from the chute, and means carried by said gate to close the chute when the gate is open.

22. In a button sewing machine, the combination with a frame, of button sewing mechanism, a button-receiving hopper pivotally mounted on said frame, a chute for conducting buttons from the hopper into attaching position, said chute being pivotally mounted to swing about the same axis as the hopper and relatively thereto, and means to vibrate the chute to present buttons successively into button-attaching position.

23. In a button sewing machine, the combination with a frame, of work-feeding means, a button-receiving hopper pivotally mounted on said frame, a chute for conducting buttons from the hopper into attaching position, said chute being pivotally mounted to vibrate about the same axis as the hopper and in a direction at right angles to the work-feeding movement, means to vibrate said chute to present buttons successively into button-attaching position, and button-sewing mechanism.

24. In a button-sewing machine, the combination with button-sewing mechanism, of work-feeding means, a button-retaining hopper, a chute communicating with the hopper and mounted for swinging movement relative thereto in a direction at right angles to the direction of feeding movement, and means to vibrate the chute to present buttons successively into button-attaching position.

25. In a button-sewing machine, the combination with work-feeding means, of a button-receiving hopper, a chute communicating therewith and mounted for swinging movement relative thereto, said chute being constructed to deliver shank-eyed buttons into attaching position with the shanks thereof extending in a direction substantially parallel to the feeding movement of the work, means to sew each button to the work, and means to vibrate the chute.

26. In a button-sewing machine, the combination with means to present a button in attaching position, of means to form a loop in a thread, a loop spreader, means to move the loop spreader into the loop to spread the latter, and means having a continuous operative engagement with said spreader to tip it thereby to carry said loop over the button.

27. In a button-sewing machine, the combination with means to form interlocking primary and secondary loops of thread and draw the primary loop through the eye of a button, of a loop spreader, means to move the loop spreader into the secondary loop to spread the latter, and means having a continuous operative engagement with said spreader to tip it thereby to carry the spread secondary loop over the button.

28. In a button-sewing machine, the combination with means to form interlocking primary and secondary loops of thread and draw the primary loop through the eye of a button, of a loop spreader having a stem, an oscillatory block in which said stem is mounted for turning movement, means to oscillate the block to carry the loop spreader into the secondary loop, and means having continuous operative engagement with the stem of the spreader in all positions of the block to tip said spreader thereby to deliver the secondary loop over the button.

29. In a button-sewing machine, the combination with means to form interlocking primary and secondary loops of thread and draw the primary loop through the eye of a button, of a loop spreader having a stem provided with a projection, an oscillatory block in which said stem is mounted for turning movement, means to oscillate the block to carry said spreader into position to spread the secondary loop, and means having continuous engagement with said projection in all positions of the block to turn the stem and tip the spreader thereby to deliver said spread loop over the button.

30. In a button-sewing machine, the combination with means to form interlocking primary and secondary loops of thread and draw the primary loop through the eye of a button, of a loop spreader having a stem provided with a projection, an oscillatory block in which said stem is mounted for turning movement, means to oscillate the block to carry said spreader into position to spread the secondary loop, a slotted actuating member, the slot of which is shaped to receive said projection in all positions of the block, and means to vibrate said actuating member thereby to tip the spreader and deliver the spread loop over the button.

31. In a button-sewing machine, the combination with means to form interlocking primary and secondary loops of thread and draw the primary loop through the eye of a button, of a loop spreader having a stem provided with a projection, an oscillatory block in which said stem is mounted for turning movement, means to oscillate the block to carry said spreader into position to spread the secondary loop, a reciprocating plunger having a forked head shaped to receive said projection between the arms thereof in all positions of the oscillatory block, and means to reciprocate said plunger thereby to tip the spreader and deliver the spread loop over the button.

32. In a button-sewing machine, the combination with a frame having a base portion and an overhanging arm, of a work support, a work-feeding member and a looper mounted on the base portion, a needle bar, a cast-off, and a loop spreader carried by the overhanging arm, a shaft journaled in said base portion, a plurality of cams thereon for operating the work support, work-feeding member and looper, a second shaft journaled in the overhanging arm, cams thereon for operating the needle bar, the cast-off, and the loop spreader, and means for operating said shafts.

33. In a button-sewing machine, the combination with a frame having an overhanging arm, of button-sewing mechanism comprising a reciprocating needle bar, a reciprocating cast-off and a loop spreader, a head detachably secured to said arm and on which said needle bar, cast-off and loop spreader are operatively mounted.

34. In a button-sewing machine, the combination with a frame having an overhanging arm, of a presser foot carried by said arm, button-sewing mechanism including a reciprocating needle, a needle backer carried by said presser foot and adapted to engage the needle during its penetrating thrust, and means for adjusting said needle backer both vertically and laterally.

35. In a button-sewing machine, the combination with a frame, of a presser foot carried thereby, button-sewing mechanism including a reciprocating needle, a pin carried by said presser foot, a sleeve loosely mounted thereon for turning movement, a split hub adjustably clamped about said sleeve, and a needle backer carried by said hub.

36. In a button-sewing machine, the combination with a frame, of a presser foot carried thereby, button-sewing mechanism including a reciprocating needle, a pin carried by said presser foot, a sleeve loosely mounted thereon for turning movement, a hub secured to said sleeve and capable of adjustment thereon both axially and angularly, and a needle backer carried by said hub.

In testimony whereof, I have signed my name to this specification.

CHRISTIAN H. T. HAGELSTEIN.